(12) United States Patent
Brodie et al.

(10) Patent No.: US 7,711,749 B2
(45) Date of Patent: May 4, 2010

(54) PRIVACY ONTOLOGY FOR IDENTIFYING AND CLASSIFYING PERSONALLY IDENTIFIABLE INFORMATION AND A RELATED GUI

(75) Inventors: Carolyn Brodie, Briarcliff Manor, NY (US); Nigel Brown, Ontario (CA); John Karat, Greenwich, CT (US); Clare Marie Karat, Greenwich, CT (US); Peter Malkin, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/841,298

(22) Filed: Aug. 20, 2007

(65) Prior Publication Data

US 2009/0055431 A1 Feb. 26, 2009

(51) Int. Cl.
*G06F 17/30* (2006.01)
(52) U.S. Cl. ........................................ 707/783; 707/805
(58) Field of Classification Search ............... 707/3, 707/100, 2
See application file for complete search history.

(56) References Cited

U.S. PATENT DOCUMENTS 7,225,183 B2 * 5/2007 Gardner .................... 707/3
2006/0173868 A1 * 8/2006 Angele et al. ............. 707/100
2008/0097968 A1 * 4/2008 Delgado et al. ............. 707/3

OTHER PUBLICATIONS

James Bret Michael eta al. (Natural-Language Processing Support for Developing Policy-Governed Software System), Jul. 2001, pp. 1-12.*
Amit Sheth, Enterprise Applications of Semantic Web; The Sweet Spot of Rist and Compliance, Aug. 2005, pp. 1-12.*

* cited by examiner

*Primary Examiner*—James Trujillo
*Assistant Examiner*—Sherief Badawi
(74) *Attorney, Agent, or Firm*—Scully, Scott, Murphy & Presser, P.C.; Daniel P. Morris, Esq.

(57) ABSTRACT

Method and system of providing an association between a system's meta-tagged data objects and a list of terms, the association indicating which objects are and are not covered by a given policy, in one aspect, may comprise obtaining a list of terms and a policy that includes one or more of the terms; identifying a plurality of meta-tags used in a system; developing one or more mappings between the terms and the meta-tags; identifying system data objects in the system having one or more meta-tags; creating for each meta-tag of each system data object identified, an association between the system data object and the one or more terms to which the meta-tag is mapped, the association indicating whether the system data object is or is not covered by the policy.

12 Claims, 6 Drawing Sheets

PRIVACY ONTOLOGY FOR IDENTIFYING AND CLASSIFYING PERSONALLY IDENTIFIABLE INFORMATION AND A RELATED GUI

CROSS-REFERENCE TO RELATED APPLICATION

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/841,274, for "A PRIVACY ONTOLOGY FOR IDENTIFYING AND CLASSIFYING PERSONALLY IDENTIFIABLE INFORMATION AND A RELATED GUI".

FIELD OF THE INVENTION

The present disclosure relates generally to computer application systems, and particularly to a method and system for identifying and classifying information using ontology and a user interface application that enables a user to navigate data objects in a system using ontology to identify and classify personally identifiable information.

Currently, it is very time-consuming and difficult for people in an organization to identify and classify personally identifiable information (PII) in the organization's computer application systems. Personally identifiable information refers to data concerning an individual, or data from which the identity of an individual may be deduced. Known technology identifies such data primarily through manual processes. There are currently no automated methods of identifying PII data and labeling that data as such. The manual methods for identifying PII are labor intensive, difficult, and subject to error. The current privacy technology product on the market such as the Tivoli Privacy Manager does not contain privacy ontology and cannot be used to solve the identified problems above.

Yahoo provides a graphical user interface (GUI) for navigating web pages based on a taxonomy of categories (e.g., Entertainment, Entertainment-Movies, and Entertainment-Television), a given taxonomy term pointing to a particular set of web links. Such methodology, however, does not allow for determining the system object that matches particular terms. Existing methodologies also do not provide any method of navigating an ontology of terms, that is, where the objects matching a particular term is dependent both on the given term (e.g., "Baker"), and also on the term's type, e.g., either the user ID "Baker," or role "Baker". Existing search methodologies do not provide a method of navigating data objects based on whether they are covered and/or protected by a given policy that includes the terms of a given ontology.

Thus, it is desirable to have a system and method that identifies and classifies personally identifiable information. It is also desirable to have an automated methodology that allows for identifying and classifying personally identifiable information. Still further, it is desirable to provide a user interface application such as a graphical user interface to enable a user to navigate through an ontology of terms to, for example, determine or view the dependency of various terms related to data objects in a system.

BRIEF SUMMARY OF THE INVENTION

Method and system for providing an association between a system's meta-tagged data objects and a list of terms, the association indicating which objects are and are not covered by a given policy are provided. The method in one aspect may comprise obtaining a list of terms and a policy that includes one or more of the terms, identifying a plurality of meta-tags used in a system, developing one or more mappings between the terms and the meta-tags, identifying system data objects in the system having one or more meta-tags, and creating for each meta-tag of each system data object identified, an association between the system data object and the one or more terms to which the meta-tag is mapped, the association indicating whether the system data object is or is not covered by the policy.

In another aspect, a method of providing an association between a system's meta-tagged data objects and a list of terms, the association indicating which objects are and are not covered by a given policy, may comprise obtaining an ontology comprising taxonomy of terms and their relationships, obtaining a policy including one or more of the terms, building a mapping between said one or more of the terms and system meta-tags using said taxonomy of terms, identifying system objects having one or more system meta-tags, and creating an association between each of said system objects and said one or more of the terms mapped to said one or more system meta-tags identified with said system object.

A system for providing an association between a system's meta-tagged data objects and a list of terms, the association indicating which objects are and are not covered by a given policy, in one aspect, may comprise a processor operable to obtain a list of terms and a policy that includes one or more of the terms. The processor may be further operable to identify a plurality of meta-tags used in a system and to build one or more mappings between the terms and the meta-tags. The processor may be also operable to identify all system data objects in the system having one or more meta-tags and create for each meta-tag of each system data object identified, an association between the system data object and the one or more terms to which the meta-tag is mapped. The association indicates whether the system data object is or is not covered by the policy. The system may further include a data store operable to store the association.

In another aspect, a user interface system for allowing a user to navigate an association between a system's meta-tagged data objects and a list of terms, the association indicating which objects are and are not covered by a given policy, is provided. The user interface system, in one aspect, may comprise a display module executable on a processor operable to prompt a user and receive from the user an identification of an ontology and an identification of a policy. The display module may be further operable to receive one or more system objects associated with the policy. The one or more system objects are determined from the association of system meta-tags and ontology of terms in the policy. The display module may be further operable to display one or more terms that caused the association to be made between said one or more system objects and the policy.

A program storage device readable by a machine, tangibly embodying a program of instructions executable by the machine to perform the above described method steps may be also provided.

Further features as well as the structure and operation of various embodiments are described in detail below with ref-

DETAILED DESCRIPTION

In one embodiment of the method and system of the present disclosure, a privacy ontology of PII data types enables some automation of identifying and classifying personally identifiable data (PII) and other related tasks are provided. An ontology is a controlled vocabulary that describes objects and the relations between them in a formal way, and has a grammar for using the vocabulary terms to express something meaningful within a specified domain of interest. The vocabulary is used to make queries and assertions. Ontological commitments are agreements to use the vocabulary in a consistent way for knowledge sharing.

An ontology can be implemented as a data model that represents a set of concepts within a domain and the relationships between those concepts. It is used to reason about the objects within that domain and to provide knowledge representation about the world or some part of it. Ontologies generally describe an individual or basic objects; classes or set, collections, or types of objects; attributes or properties, features, characteristics, or parameters that objects can have and share; relations or ways that objects can be related to one another; and events: the changing of attributes or relations.

Ontologies can employ the information from taxonomies. In addition, ontologies define the relationships between the objects. A taxonomy is a hierarchical organization for sets of objects. Taxonomies are used to group similar kinds of items, things, persons, etc. together, placing more general definitions at the top of the hierarchy and more specific ones at lower nodes in the taxonomy. Two of the most well-known and widely accepted global taxonomies are the United Nations Standard Products and Services Code® (UNSPSC) and the North American Industrial Classification System (NAICS) taxonomy.

An ontology may have a common root and domain-specific branches. The ontology may cover both unstructured and structured information. The ontology may address a number of challenges. The privacy ontology may provide users a mechanism that could be part of a tool or system to perform the task. The privacy ontology also could assist in the identification of unprotected data during simulation of a privacy policy. Still yet, the privacy ontology may facilitate the setting of a risk classification level for de-identified data processed through a transformation engine.

Figure 6:
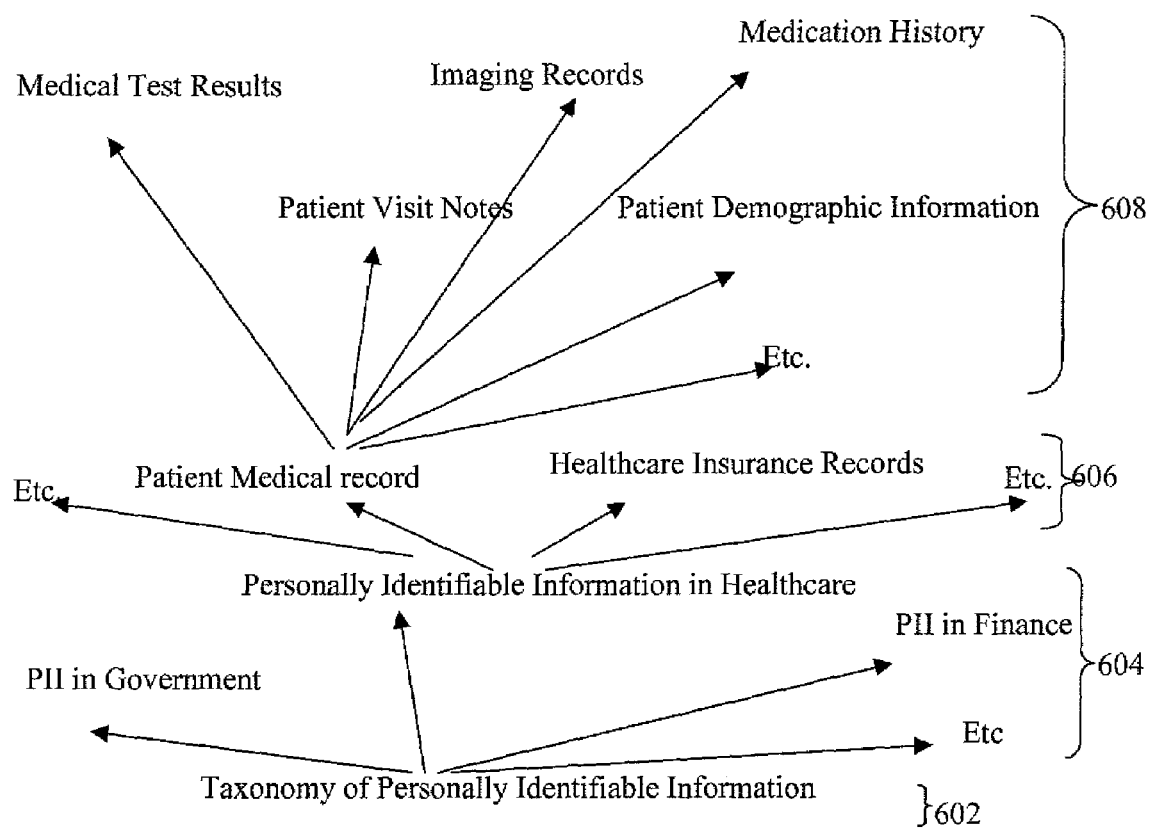
FIG. 6 illustrates an example of a private ontology having a tree structure in one embodiment of the present disclosure.

FIG. 6 illustrates an example of a privacy ontology. As an example, a privacy ontology may include a hierarchical organization of all of the types of data categories of PII and a rationale for the relationships between the levels and categories of information. There may be a common root 602 of these terms that applies to all people. This common root 602 may be supplemented by domain specific branches 604 for types of PII, for example, related to healthcare, finance, travel, or entertainment. The domain specific branches 604 may further be categorized into types 606 that apply to the specific domain. Each type 606 have sub-categories 608 of terms that apply to that type. Further branching may exist from the sub-categories 608 as is desired or needed.

An organization may use the ontology as part of a larger text-analytics search tool, for example, to identify the PII data types in the organization's electronic information including data stores and business processes. The tool may be used to perform an initial identification and categorization of PII data elements automatically. An operator then may manually review the initial identification and categorization results and modify them as necessary.

In creating privacy policies enforced through technology, the identification and matching of PII data types in privacy policies expressed in natural language or machine readable form needs to be matched to the locations where the PII is stored. A privacy ontology of the present disclosure in one embodiment may enable this process, for example, by making initial automated matches that might be modified by a person. The privacy ontology of the present disclosure may further identify unprotected PII data through simulations of the privacy policy prior to deployment. For example, if a privacy policy is authored and the ontology is used to identify PII data elements in data stores, a privacy ontology of the present disclosure as part of another tool or system may conduct a gap analysis to identify unaddressed or unprotected PII data through a simulation of what the privacy policy would enforce when implemented.

In some circumstances, such as medical research, it is necessary to be able to de-identify PII data to an appropriate level of abstraction so that the medical research can proceed and yet the identities of those persons providing PII is protected. If the data is de-identified to a large degree, the risk of inappropriate disclosure may be very low, however, the remaining data may be of little or no value to medical researchers. And vice versa, if the PII data is not de-identified enough, the medical researchers may have more PII information than is needed and the risk of inappropriate disclosure of PII is high. A privacy ontology of the present disclosure in one embodiment may be augmented by a healthcare domain branch and enable the organization to set the proper level of abstraction of the data and provide all parties with a documented risk classification level for the actions taken.

Figure 1:
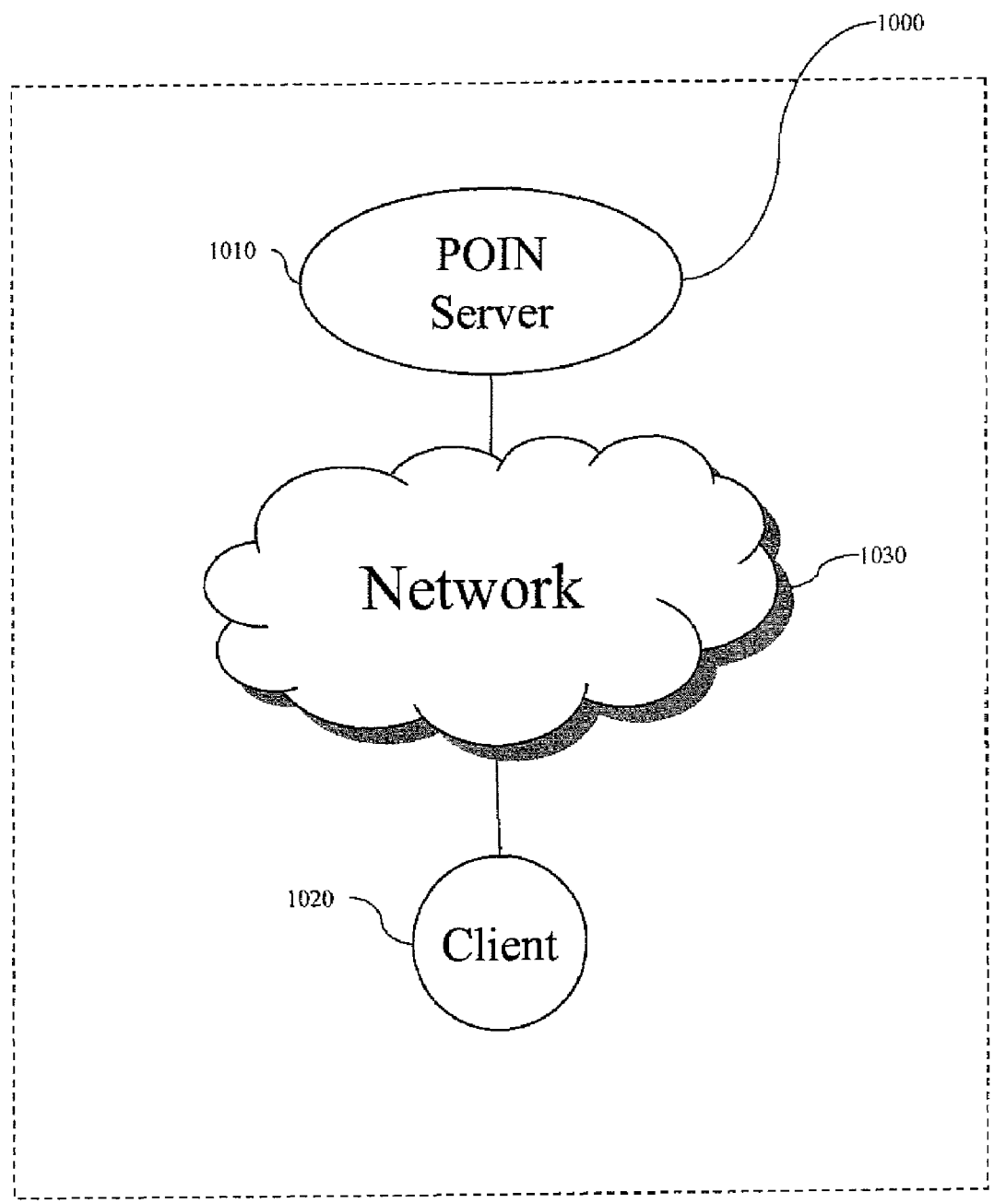
FIG. 1 is an illustrative diagram showing an example of a network topology of one embodiment of the present disclosure.

In the description below, the method and system of the present disclosure in one embodiment are illustrated with respect to a POIN Server 1010 that enables the identification of personally identifiable information such as system data. It should be understood, however, that the method and system is not limited to the use of a server only; rather, any other means or mechanism may be used to implement the method and system of the present disclosure. Referring to FIG. 1, the POIN server 1010 may relate to the rules of a given policy and the rules are made of the terms from a given ontology of terms. In another embodiment, a graphical user interface (GUI) enables a user to navigate system objects using the ontology of terms as keys. The example below assumes the policies adhere to the privacy profile of the OASIS XACML standard provide link to standard and supply hardcopy with application). Briefly, the OASIS XACML standard is an international standard for security access control policies and includes a privacy profile. The standard defines the elements in a complete privacy access control policy rule. A predefined grammar in one embodiment specifies that a given policy includes zero or more rules. A rule has the following form in one embodiment:

(User category) (Permission) (Action) (Data category) (Purpose) (Condition optional) where:

(User category) indicates applicable role or user for the given rule;

(Permission) indicates whether the result of the rule is the permitting or the denial of access;

(Action) specifies the function or application that is either permitted or denied by the given rule, (Data category) indicates the type of data object that is governed by the rule, (Purpose) indicates the reason the given role is attempting to perform the given action to the given data category, and an optional (Condition), which specifies Boolean (true or false) function that is evaluated whenever the given rule is checked, the given rule only being acted upon if the given condition is true.

Examples of rules may include:

"Doctors can read blood test results for the purpose of medical treatment"

User category=Doctors

Permission=can

Action=read

Data category=blood test results

Purpose=medical treatment

"Nurses cannot read patient addresses for the purpose of billing."

User category=Nurses

Permission=cannot

Action=read

Data category=patients addresses

Purpose=billing

FIG. 1 shows an example of a network topology that supports a method and system of the present disclosure. A client 1020 and a POIN Server 1010 are enabled to communicate to each other via a network 1030. The client 1000 may be any computing node. The client 1000 may be a web client that can provide a web browser (HTTP client) capability. Examples of platforms that support the client 1000 may include but is not limited to any device that can act as web client, for example, including functionality for executing a web browser application and that can communicate with the server 1010 via the network 1030. Such devices include, but are not limited to, an IBM ThinkPad® running Windows XP® and a web browser such as Microsoft's Internet Explorer®. Client devices may include a network-connectable mobile or portable functionality. Example may include devices such as those sold under the trademark WorkPad® by IBM, as well as smart cellular telephone devices which can act as a cellular telephone as well as run network applications such as web browsers. Another example of such mobile or portable devices may include, but is not limited to, Nokia 90008 by Nokia. Both of these mobile devices provide a web browsing application. A person of ordinary skill in the technological art will appreciate that although only a single client 1000 is shown in FIG. 1, the method and system of the present disclosure also may cover any number of such clients 1000. The network 1030 includes, but is not limited to, the Internet, an internal intranet, or a wireless on wired telecommunication network. The POIN Server 1010 will be described in detail with reference to FIGS. 2-5.

Figure 2:
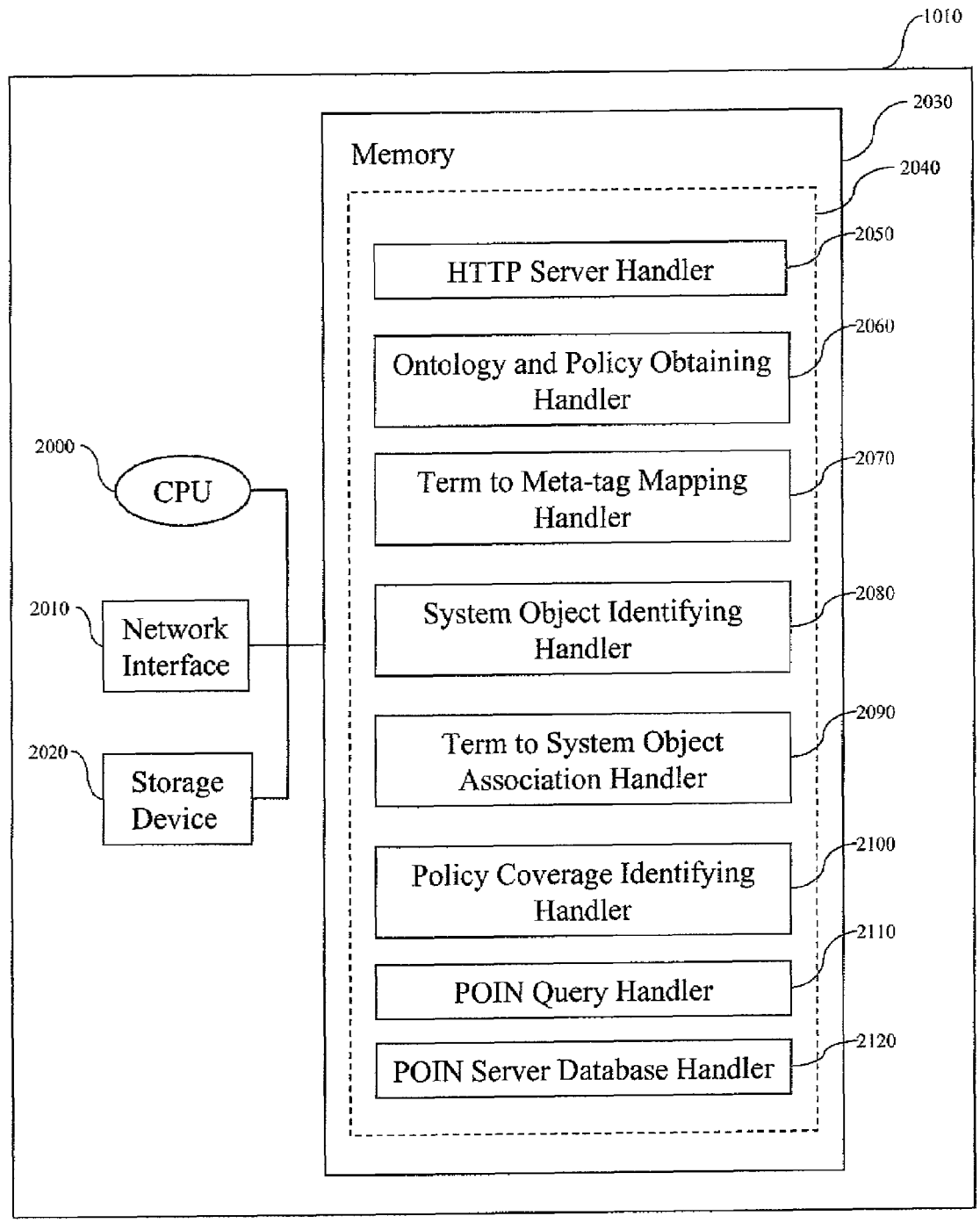
FIG. 2 is an illustrative block diagram showing an example of a POIN (Privacy Ontology Identification and Navigation) Server in one embodiment of the present disclosure.

FIG. 2 illustrates a more detailed component diagram of the POIN Server 1010 in one embodiment of the present disclosure. This server 1010 may comprise any computing node that is able to load and execute programmatic code, including, but not limited to: products sold by IBM such as ThinkPad® or PowerPC®, running the operating system and server application suite sold by Microsoft, e.g., Windows® XP, or a Linux operating system. As shown in FIG. 2, the POIN server 1010 may include a processor device, CPU 2000, a network interface 2010, a storage device 2020 such as a magnetic or optical disk storage or a direct access storage device (DASD) or any other storage device, and a memory 2030, such as RAM or any other memory device. A server logic 2040 may be embodied as computer executable code that is loaded from, for example, a remote source (e.g., over the network 1030 via the network interface 2010), local permanent optical (CD-ROM), magnetic storage (such as disk), or DASD 2020 into memory 2030 for execution by CPU 2000.

A memory 2030 may include computer readable instructions, data structures, program modules and application interfaces that provide the following functionalities: an HTTP Server Handler 2050; an Ontology and Policy Obtaining Handler 2060, described in detail with reference to FIG. 3; a Term to Meta-tag Mapping Handler 2070, described in detail with reference to FIG. 3; a System Object Identifying Handler 2080, described in detail with reference to FIG. 3; a Term to System Object Association Handler 2090, described in detail with reference to FIG. 3; a Policy Coverage Identifying Handler 2100, described in detail with reference to FIG. 3; a POIN Query Handler 2110, described in detail with reference to FIG. 4; and a POIN Server Database Handler 2120.

The HTTP Server Handler 2050 may be any application that implements functionality for responding to HTTP communications, and may be embodied as the WebSphere® product (e.g., a servlet execution engine) sold by IBM. In one embodiment, all communications between the web browser running on client 1020 and the handlers 2060, 2070, 2080, 2090, 2100, 2110, 2120 running of the point server 1010 are performed through this handler 2050 using the HTTP protocol. A person of ordinary skill in the technological art will appreciate that other forms of network communication could also be used, including but not limited to simple BSD socket based TCP/IP.

The POIN server database handler 2120, in one embodiment, provides for creation, deletion and modification of persistent data, and may be used by the handlers 2060, 2070, 2080, 2090, 2100, 2110, 2120 of the POIN server 1010. An example of a product providing such function includes the DB/2 database system produced by IBM.

Figure 3:
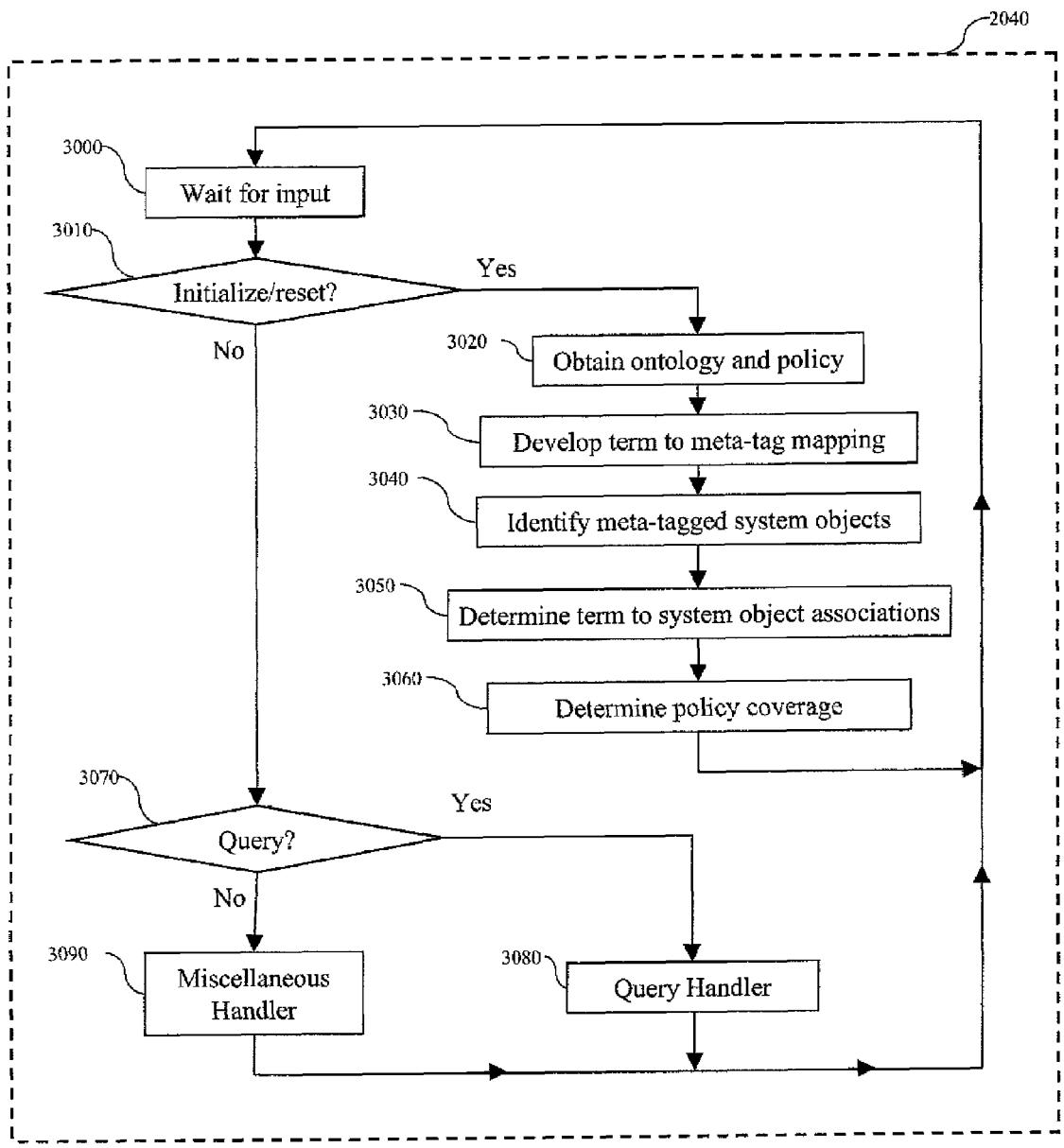
FIG. 3 is a flow diagram illustrating flow control of a POIN Server in one embodiment of the present disclosure.

FIG. 3 is a flow diagram illustrating a control flow of the POIN server's logic 2040 in one embodiment of the present disclosure. At step 3000, the POIN server 1010 waits for input. When an input is received, step 3010 determines whether it is a request for the data held in the POIN Server Database 2120 to be initialized or updated. In one embodiment of the method and system of the present disclosure, this request can come as a web request from the web browser running on the client 1020. If the input is a request for the POIN Server Database Handler's data to be initialized (i.e., create for the first time), or updated (i.e., recalculated), then in step 3020 an Ontology and Policy Obtaining Handler 2060 is invoked. This handler 2060 retrieves the ontology. In one embodiment, the handler 2060 retrieves the ontology from the Storage Device 2020 and it is then called into Memory 2030 or it may be stored dynamically in Memory 2030. The one or more policies that handlers 2060, 2070, 2080, 2090, 2100, 2110, 2120 may use the retrieved ontology. The Ontology and Policy Obtaining Handler 2060 stores both the ontology (e.g., each term, its type and its inter-relationship with other terms) and the policy (e.g., the XACML encoding) in the POIN Server Database 2120. In one embodiment, a user may author the policy using the OASIS XACML standard or some other standard. The user-authored policy may be stored in the Storage Device 2020 and/or dynamically in Memory 2030. A person of ordinary skill in the technological art will appreciate that an ontology could be calculated from a given policy, for example, the terms, their type, etc. may be parsed from the given policy. Given this approach, every term would be in the given policy. More than one policy may be specified and handled, for example, more than one policy may be parsed to create ontologies. In one embodiment, the Ontology and Policy Obtaining Handler 2060 stores all of the specified policies in the database 2120, and if necessary, extracts ontology terms from all of the specified policies as well.

At step 3030, a mapping between all of the system meta-tags and the terms of the ontology is created by the Term to Meta-tag Mapping Handler 2070. This mapping provides an association between system meta-tag (e.g., UID or read-accessible) and one or more ontology terms. Generally, a system meta-tag is information about an object in a system. An object may have a meta-tag is associated with it in the system through use of a table, file, or other mechanism. For example, the system meta-tag read-accessible associated with a file object on a system would be mapped to both the term "read" and "view." Each of the these mappings is stored by the POIN Server Database Handler 2120.

At step 3040, all of the meta-tagged system objects are identified by the system Object Identifying Handler 2080. This involves scanning the system's resources, possibly with the help of one or more of the system's resource managers (e.g., the Linux File system, Windows File Manager, etc.) and determining all of the meta-tags that apply to each of the identified system objects. In one embodiment of the method and system of the present disclosure, each system object and meta-tag associations is stored for possible later use via the POIN Server Database Handler 2120.

At step 3050, the associations between all of the terms and system objects are determined by the Term to System Object Association Handler 2090, which stores each of the these associations for later possible use with the POIN Server Database Handler 2120. In one embodiment of the method and system of the present disclosure, this may be accomplished by first retrieving a list of all of the meta-tagged system objects from the POIN Server Database Handler 2120, determining for each meta-tagged object a list of all of the meta-tags associated with the given object, and associating all of the terms mapped to each given meta-tag to the given system object, all of the term to system object association being stored via the POIN Server Database Handler 2120.

At step 3060, a Policy Coverage Identifying Handler 2100 determines which of the system objects are covered by the specified privacy policies. In one embodiment of the method and system of the present disclosure, a given system object to be covered by a given policy if there is at least one rule in the given policy whose term values for each of the user, action and data categories match the mapped term value of the given system object. For example, the object, "c:/users/johndoe/ssn.txt" matches the Billing Policy because this policy contains the rule: "Accounting department can access the SSN of patients for the purpose of billing" and the object's owner is mapped to the term "Billing department" and the object's access rights include "read" which is mapped to the action "access", and the object's full file name is mapped to the data category "SSN". The Policy Coverage Identifying Handler 2100 in one embodiment determines such coverage for all of the meta-tagged system objects and all of the specified policies, all associations being store using the POIN Server Database Handler 2120 in one embodiment. Following this, control continues at step 3000. The mapping between the system policies and the system objects is updated and the completeness of the coverage is being determined. For instance, if there was a gap—that is, a system policy element that was not mapped to a system object, it would be identified at this point in the method.

If the request is not one to create or update the database handler's 2120 data, then step 3070 checks whether it is a request to query the existing or current data. If so, then, at step 3080, a POIN Query Handler 2110 (described in detail with reference to FIG. 4) is invoked, following which, control continues at step 3000. If the input is not a query, then a miscellaneous handler may be invoked in step 3090 to respond to the miscellaneous request, following which control continues at step 3000.

Figure 4:
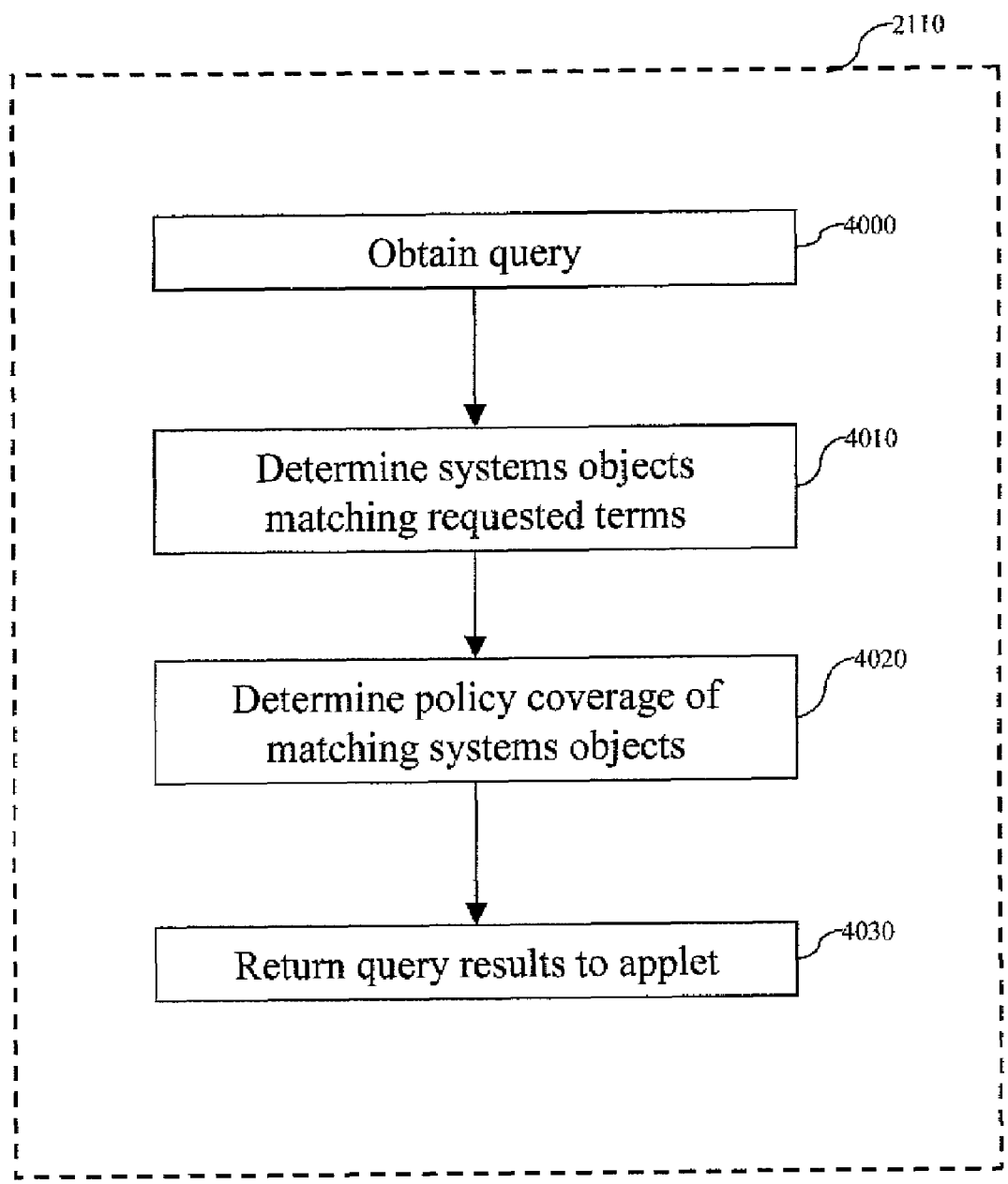
FIG. 4 is a flow diagram of the Query Handler in one embodiment of the present disclosure.

FIG. 4 is a flow diagram illustrating a control flow of a POIN Query Handler 2110 in one embodiment of the present disclosure. In this embodiment, the handler 2110 receives, for example, requests sent from an applet running on the web browser running on the client 1020, determines the matching system objects and then returns this data to the applet, for example, for display to an end-user. At step 400, the POIN Query Handler 2110 parses the requested terms and their associated values from the specified query. This may include determining which term values are included in the query (for example, user category, action data category, but no purpose) and the values for each of the requested terms. For example, user category="Billing department," action="access" and data category="SSN" or "address". At step 4010, the POIN Query Handler 2110 determines which system objects match the requested terms from the ontology. In one embodiment of the present disclosure, this may be accomplished by sending an SQL query to the POIN Server Database Handler 2120, which requests this data. At step 4020 the POIN Query Handler 2110 determines which of the matching system objects are covered by which of the specified policies. Once complete, step 4030 sends the matching system object data along with the policy coverage data back to the applet running on the web browser on the client 1020, possibly to be displayed or provided for interaction to an end-user.

Figure 5:
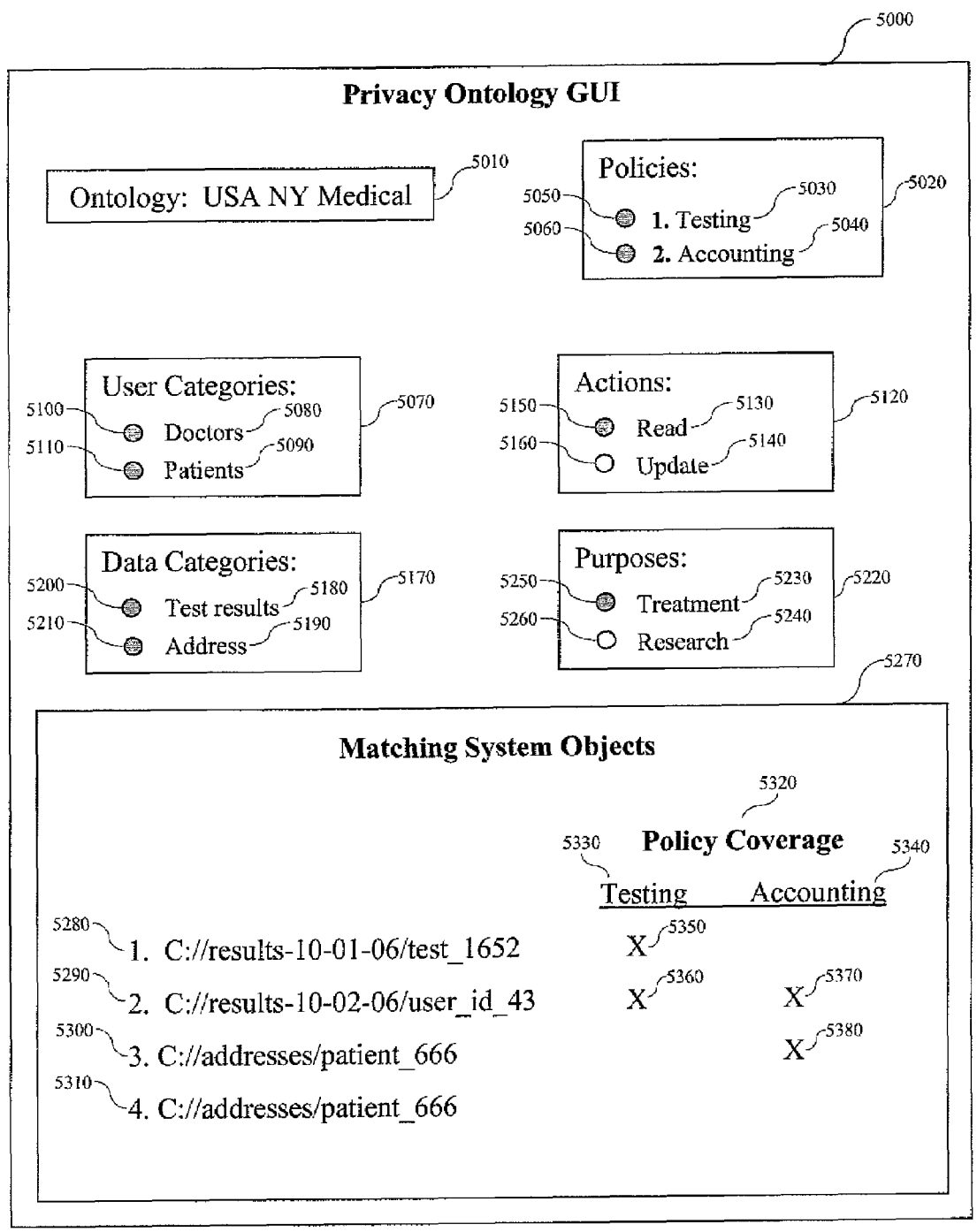
FIG. 5 is an example of a privacy ontology-based graphical user interface in one embodiment of the current invention.

FIG. 5 is an example of a POIN GUI 5000 in one embodiment of the present disclosure. The GUT may be provided by the applet running on the web browser of the client 1020. The GUI provides an interface for a user to interact with personally identifiable information in the computer system. For example, in the context of a Medical ontology for the US being employed in a computer system in NY, a user wants to use that ontology to tie or map the system policies to the system objects. A user may select or enter this ontology on the GUI, for example, shown at 5010. For instance, the GUI may display or otherwise provide or prompt a user to select an ontology, for example, from a dropdown list of ontologies. Ontologies can employ the information from taxonomies. In addition, ontologies define the relationships between the nodes in the ontologies. Similarly, a user may select one or more policies 5020 to which the user desires to map the system objects. The GUI, for instance, may list one or more policies, which the user may select, for example, using radio buttons 5050, 5060, or clicking on an item in a dropdown list, etc. In the policy example shown in FIG. 5, a user works with two policies, one related to medical tests 5030 and a second related to accounting 5040.

The selected ontologies and policies are then used to find the matching system objects that are covered under the selected policies, for example, as described with reference to FIG. 3 and FIG. 4. In one embodiment, the GUI also enables the user to view the elements in the policy and determine policy coverage 5320 through the display of the mapping or matching of the system objects to the policies. In the example shown in FIG. 5, the display shows that two system objects 5280, 5290 are covered by the Testing policy 5330 as denoted by 'X' marks 5350, 5360 and two system objects 5300, 5310 are covered by the Accounting policy 5340 as denoted by 'X' marks 5370, 5380. Any other mechanism may be used to show or denote that a given object is covered by a given policy, including but not limited to, highlighting, using different color notations, fonts, etc.

In one embodiment, the GUI may also provide a display or otherwise show one or more elements that triggered the finding of matches between the system objects and the policies. For instance, in the user categories 5070, there was a match in the doctors and patients categories 5080, 5090. The elements may be shown as a list, highlighted radio buttons 5100, 5110, or in any other way. The example in FIG. 5 also shows elements that caused the mapping in the actions category 5120. For instance, the highlighted radio button 5150 associated with read action category 5120 may indicate that the read element in the action category contributed to the mapping. In the example shown in FIG. 5, the update action 5140 is not highlighted by its radio button 5160. This may indicate that the update action was not part of the mapping. Similarly, in the data categories 5170, both the test results 5180 and address 5190 elements have highlighted radio buttons 5200, 5210, indicating that both data category element were in the mapping. Likewise, in the purposes category 5220, treatment 5230 element has highlighted radio button 5200, and research 5240 element's radio button 5260 is not highlighted, indicating that the treatment 5230 element contributed to the mapping while the research 5240 element did not. Any other mechanism of showing or otherwise providing elements that were involved in the matching of the system objects to the selected policies may be used in the GUI.

While the examples described above illustrated various functionalities in the method and system of the present disclosure being performed by various components and handlers, it is not necessary that a specific function be performed by a specific component or handler shown above. Rather, the components and handlers are illustrated as logical functional components. Thus, any one or more processing units may perform the functionalities described above.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for providing an association between a system's meta-tagged data objects and a list of terms, the association indicating which objects are and are not covered by a given policy, comprising:

a processor operable to obtain a list of terms and a policy, the policy including one or more of the terms and at least one rule, the at least one rule comprising one or more of: a user category, an action, and a data category, the user category indicating at least one applicable user for the at least one rule, the action specifying at least one application that is either permitted or denied by the at least one rule, the data category indicating a type of data object that is governed by the at least one rule, the processor further operable to identify a plurality of meta-tags used in a system and to build one or more mappings between the terms and the meta-tags, the processor further operable to identify all system data objects in the system having one or more meta-tags and create for each meta-tag of each system data object identified, an association between the system data object and the one or more terms to which the meta-tag is mapped, the association indicating whether the system data object is or is not covered by the policy by determining whether there exists the at least one rule in the policy whose terms for the user category, the action and the data category match terms of the system data objects; and a data store operable to store the association.

2. The system of claim 1, wherein the data store includes memory.

3. The system of claim 2, wherein the data store includes a database.

4. The system of claim 2, further including: a user interface operable to interact with a user and enable a user to navigate one or more of the system data objects using ontology.

5. The system of claim 4, wherein the user interface module is further operable to provide one or more system objects covered by the policy.

6. The system of claim 4, wherein the user interface module is further operable to allow a user to enter an ontology having the list of terms.

7. The system of claim 4, wherein the user interface module is further operable to allow a user to enter the policy.

8. The system of claim 4, wherein the user interface module resides on a client machine remotely located from the processor.

9. A user interface system for allowing a user to navigate an association between a system's meta-tagged data objects and a list of terms, the association indicating which objects are and are not covered by a given policy, comprising:
- a processor;
- a memory in communication with the processor;
- a display module residing in the memory and executable by the processor operable to prompt a user and receive from the user an identification of an ontology and an identification of a policy, the policy including one or more of the terms and at least one rule, the at least one rule comprising one or more of: a user category, an action, and a data category, the user category indicating at least one an applicable user for the at least one rule, the action specifying at least one application that is either permitted or denied by the at least one rule, the data category indicating a type of data object that is governed by the at least one rule, the display module further operable to receive one or more system objects associated with the policy, the association indicating whether the one or more system objects is or is not covered by the policy by determining whether there exists the at least one rule in the policy whose terms for the user category, the action and the data category match terms of the one or more system objects, the one or more system objects determined from the association of system meta-tags and ontology of terms in the policy, the display module further operable to display one or more terms that caused the association to be made between said one or more system objects and the policy.

10. The user interface system of claim 9, wherein the display module is embodied as a web client.

11. A program storage device readable by a machine, tangibly embodying a program of instructions executable by the machine to perform a method of providing an association between a system's meta-tagged data objects and a list of terms, the association indicating which objects are and are not covered by a given policy, comprising:
- obtaining an ontology comprising taxonomy of terms and their relationships;
- obtaining a policy including one or more of the terms and at least one rule, the at least one rule comprising one or more of a user category, an action, and a data category, the user category indicating at least one an applicable user for the at least one rule, the action specifying at least one application that is either permitted or denied by the at least one rule, the data category indicating a type of data object that is governed by the at least one rule;
- building a mapping between said one or more of the terms and system meta-tags using said taxonomy of terms;
- identifying system objects having one or more system meta-tags;
- creating an association between each of said system objects and said one or more of the terms mapped to said one or more system meta-tags identified with said system object;
- determining whether one or more of the system objects are covered under the policy based on the association; and
- evaluating whether there exists the at least one rule in the policy whose terms for the user category, the action and the data category match terms of the one or more system objects.

12. The system of claim 1, wherein the system data object is a file path.

* * * * *